Oct. 27, 1942.            G. HEMPEL            2,300,220
TELEMETERING SYSTEM
Filed April 7, 1941
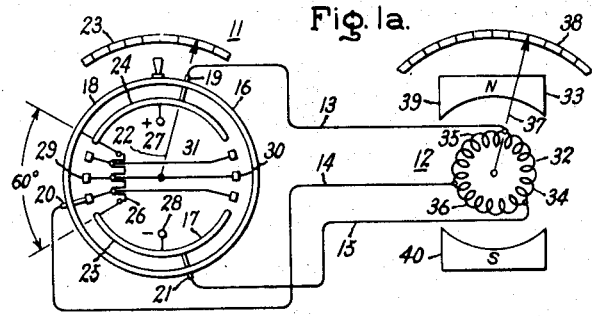
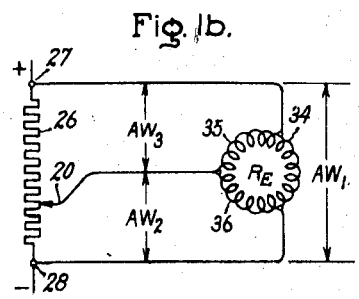
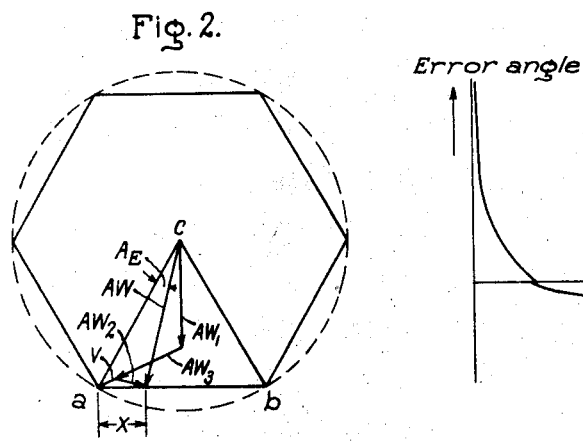
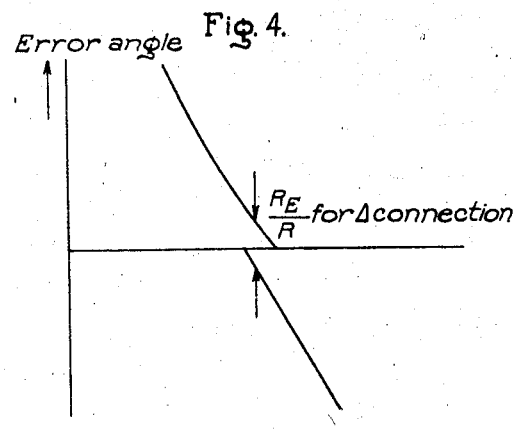
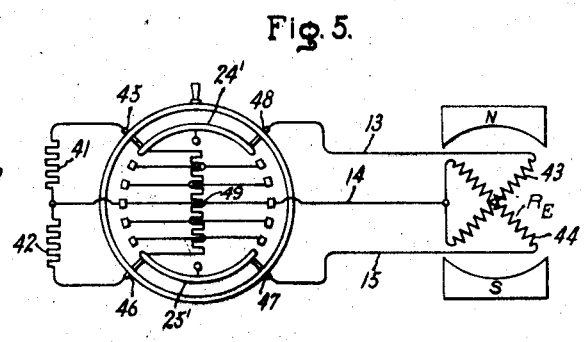
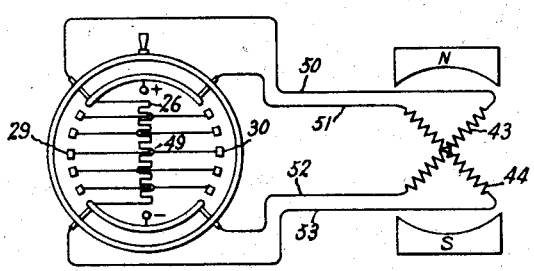
Inventor:
Gerd Hempel,
by Harry E. Dunham
His Attorney.

Patented Oct. 27, 1942

2,300,220

UNITED STATES PATENT OFFICE 2,300,220

TELEMETERING SYSTEM

Gerd Hempel, Berlin-Reinickendorf, Germany, assignor to General Electric Company, a corporation of New York Application April 7, 1941, Serial No. 387,301
In Germany January 30, 1940

6 Claims. (Cl. 172—239)

My invention relates to telemetering or remote-indicating systems and concerns particularly such systems adapted to be energized by direct current.

It is an object of my invention to provide a telemetering system of low power consumption and cost and in which a high degree of precision is attained in the fidelity with which indications or angular positions of a transmitter are reproduced by a receiver.

Other and further objects will become apparent as the description proceeds.

Direct current telemetering systems are known which operate according to the potential divider principle, in which the transmitter is built as a potentiometer and is energized by means of a source of direct current. Besides those transmitters which are built as straight line potentiometers there are annular type potential dividers. In apparatus embodying my invention, the transmitters are equipped with two opposite arcuate contact segments of 90 degrees width for "two phase" systems or 120 degrees width for "three phase" systems. The potentiometer resistance is mounted within the angle remaining between the contact segments. From the ring so formed are tapped by means of contact arms or brushes at least one variable voltage and one or more fixed voltages. The receiver system is made up of several coils forming a field winding cooperating with a rotatable magnet adapted to rotate in a field produced by a stationary magnet. The variable voltage of the transmitter produces such current relationships in the receiver coils as to produce the required rotation of the movable element at the receiver. The manner of connection of the receiver coils simulates that of various phase coils in polyphase alternating current work. For example, the receiver coils may be Y-connected or delta-connected in the case of three coils, which may be called a three-phase system. They may be connected two-phase in the case of two coils. As in alternating-current work the use of either two or three coils results in a three-wire system, and additional wires would be employed for additional coils. For the sake of convenience, by analogy to alternating current practice, the direct-current energized coil systems are referred to simply as "polyphase" systems.

In the case of direct-current telemetering installations subjected to very rough service (for instance in the case of rudder-position indicators on board ship) operating safety makes it advisable to tap the voltages from the transmitter by means of contacts which lead to tapping points at the potential divider resistor. Accordingly, the voltage and the adjustment of the receiver will change abruptly from step to step. In most installations of that kind, it is required that the rotation of the receiver should correspond exactly, from contact to contact, to the angle of rotation at the transmitter. Practical experience has proved, however, that this requirement could not hitherto be strictly observed in general. The reason is that, because of the particular nature of the parallel connection of transmitter and receiver resistances, the adjustment angle at the receiver, angle $A_E$, does not vary proportionally with the tapped resistance $R_y$, at the transmitter or the transmitter rotating angle $A$ but changes with $R_y$ in accordance with a tangential law.

In order to obtain an adjustment at the receiver which corresponds exactly to the adjustment at the transmitter, it has already been proposed to subdivide the transmitter resistor not uniformly and evenly, but to subdivide it into irregular steps which can be determined empirically in such a way that the resistance $R_y$, is always adapted to the connected angle at the receiver. The irregular subdivision of potential-divider steps offers, though only in special cases, the possibility of bringing the receiver angle of rotation $A_E$ in a state of linear dependence on the angle of rotation at the transmitter, angle $A$. In "two-phase" systems the complete elimination of the above-mentioned error angle for the entire control range of the transmitter is possible only when either special compensation resistors or other switching schemes are provided, but these require additional transmitting lines. In the cases of three-coil systems, freedom from any electric faults in the receiver adjustment can be attained by a suitable, uneven subdivision of the transmitter resistor R. Nevertheless, the uneven subdivision of the transmitter resistor R is expensive and creates difficulties in manufacture. The resistor steps must all be compensated, and there exists the danger that some steps, which on first sight are scarcely to be distinguished from each other, may be interchanged during their assembly.

It is an object of my invention, accordingly, to provide an improvement in direct-current telemetering systems which eliminates the complicated compensation and assembly of uneven stepped potential dividers at the transmitter and which assures, at the same time, that the receiver will follow the transmitter indication substantially exactly.

In accordance with my invention, in its preferred form, errors are reduced to a minimum in a very simple manner by utilizing a definite resistance ratio between the resistance of the receiver coil system and the transmitter resistance. The transmitter resistance is caused to vary linearly with respect to its taps or the angular movement of the pointer or arm at the transmitter.

The invention will be understood more readily from the following detailed description when considered in connection with the accompanying drawing and those features of the invention which are believed to be novel and patentable will be pointed out in the claims appended hereto.

In the drawing Fig. 1a is a schematic diagram illustrating the principle of operation in general; Fig. 1b is a circuit diagram of the arrangement shown in Fig. 1a and representing 60 degrees of the entire range of operation of 360 degrees shown in Fig. 1a; Fig. 2 is a vector diagram explaining the principle of operation of the apparatus represented in Figs. 1a and 1b; Fig. 3 is a graph representing the angular error plotted in a vertical direction against resistance ratios plotted in a horizontal direction; Fig. 4 is a reproduction to a larger scale of a portion of the curve of Fig. 3; Fig. 5 is a schematic diagram of another embodiment of my invention taking the form of a compensated two-phase system; and Fig. 6 is a schematic diagram of still another embodiment of my invention in the form of an uncompensated two-phase system.

The telemetering system illustrated in Fig. 1a comprises a transmitter 11 and a receiver 12 joined by three conductors, 13, 14 and 15. The transmitter 11 comprises a pair of relatively rotatable elements 16 and 17. For convenience the element 16 will be considered as the rotatable element and the element 17 as the stationary element, but my invention is not limited to this specific arrangement.

The rotatable element 16 comprises a rotatably mounted ring 18 carrying three brushes 19, 20 and 21, spaced angularly 120 degrees apart around the ring and electrically connected to the conductors 13, 14 and 15, respectively. The rotatable ring 18 also carries an indicating pointer or operating arm 22 with which a scale 23 (shown only in fragmentary form) is adapted to cooperate. Any suitable means (not shown) for rotatably mounting the ring 18 may be employed, and it will be understood that suitable means such as slip rings and collector brushes, or flexible spiral leads are to be employed for permitting relative movement between the brushes 19, 20 and 21 and the stationary terminals (not shown) to which the conductors 13, 14 and 15 are connected.

The stationary element 17 comprises a pair of contact segments 24 and 25, a resistor 26 electrically connected between the segments 24 and 25, and a source of direct current, represented by the plus and minus terminals 27 and 28 electrically connected respectively to the contact segments 24 and 25. The contact segments 24 and 25 are in arcuate form concentric with the rotatable ring 18 so as to cooperate with the brushes 19, 20 and 21 and are each 120 degrees in angular length with 60 degree angular spacing between the adjacent ends. The resistor 26 is provided with a plurality of equidistant taps or contacts 29 and 30 equidistantly spaced along circular arcs in the gaps between the ends of the contact segments 24 and 25.

Groups of contacts 29 and 30, shown in the left-hand and right-hand gaps, respectively, are shown as only three in number for the sake of simplicity in the drawing. However, it will be understood, that in order to obtain precision in the angular indications to be transmitted, a relatively large number of such contacts will be required. Cross connections 31 between the corresponding contact segments in groups 29 and 30 are provided. It will be understood that the brushes 19, 20 and 21 are adapted to make contact with the contacts 29 and 30 and the contact segments 24 and 26 successively as the brush-carrying ring 18 is rotated.

The receiver shown in Fig. 1a also consists of a pair of relatively rotatable members 32 and 33 which, for the sake of convenience, will be referred to as the rotatable and stationary members respectively. The rotatable member consists of delta-connected coils, 34, 35 and 36 forming a magnetic armature winding and carries a pointer 37 adapted to cooperate with a scale 38 also shown in fragmentary form. The coils 34, 35 and 36 may be provided with a magnetic core (not shown) for the sake of increased torque if desired. For the sake of convenience, the stationary element 33 of the receiver 12 is indicated diagrammatically by a pair of north and south pole pieces 39 and 40 of a magnet which may either be a permanent magnet or an electric magnet energized with direct current. Although I have referred to a receiver in which the delta-connected coils are rotatable, it will be understood that my invention is not limited to this arrangement and that the receiver may, if desired, be of the type illustrated in Patent No. 2,181,803, Faus, in which the rotor is a transversely magnetized high-coercive-force cylindrical permanent magnet and the stator consists of three delta-connected coils mounted on an annular core concentric with the rotor.

The telemetric system shown in Fig. 1a is adapted to transmit angular indications at any point in the entire periphery of a circle of 360 degrees or to transmit rotations from a transmitting station to a receiving station. I shall explain hereinafter how the receiver pointer 37 is caused to follow the angular rotation of the transmitter pointer 22 with a high degree of fidelity. It will be apparent that for each revolution of the transmitter pointer 22, there will be six ranges of operation each consisting of 60 degrees as a result of the three different brushes 19, 20 and 21 that have to pass over the two groups of resistor taps or contacts 29 and 30. Within any one of these 60-degree ranges of operation, two of the brushes, for example, the brushes 19 and 21 remain electrically connected to the contact segments 24 and 25 so that the potential difference between them remains constant for any angular position within the 60 degree range. However, the potential differences between the remaining brush, for example, the brush 20 and the other two brushes vary in accordance with the angular position of the transmitter pointer 22.

This condition is represented in simplified form by the circuit diagram of Fig. 1b, wherein the brush 20 linearly traverses the resistor 26 in proportion to the angular rotation of the transmitter pointer 22. It will be seen that the voltage across the receiver coil 34 remains constant, whereas the voltages across the receiver coils 35 and 36 depend upon the position of the brush 20 and the sum of the voltages applied to the coils 35 and 36 equals the voltage applied to the coil 34 which is the potential difference between the plus and minus terminals 27 and 28.

The angular position taken up by the rotor 32 depends of course upon the angular directions and relative magnitudes of the field strengths of the three coils, that is to say, upon the vector value of the resultant field strength or magnetomotive force of the receiver field winding. The vector diagram representing the magnetomotive force is shown in Fig. 2. The magnetomotive force of fixed value produced by the coil 34, to which a fixed voltage is applied throughout the 60 degree range considered, is represented by the vector $AW_1$ having a direction straight downward to correspond to the angular direction of the coil 34. The magnetomotive forces of the coils 36 and 35 are represented by the vectors $AW_2$ and $AW_3$, respectively, making angles of 120 degrees with the vectors $AW_1$, since they are mounted 120 degrees apart on the rotor 32. Since the scalor sum of the voltages applied to the coils 35 and 36 is equal to the scalor value of voltage applied to the coil 34, the locus of the end point of the vector AW, which is the resultant of the vectors $AW_1$, $AW_2$ and $AW_3$, will be a straight line $ab$ which forms an equilateral triangle with the origin $c$ of the vectors as shown in Fig. 2. This results from the trigonometry of the figure, bearing in mind that the line segment $v$ will be equal in length to the magnetomotive-force vector $AW_2$ which also makes an angle of 30 degrees with the base line $ab$. The limiting positions of the resultant magnetomotive-force vector AW are the lines $ca$ and $cb$ forming the sides of the equilateral triangle $abc$.

Considering all six 60-degree ranges of operation of the telemetering system, the terminal point of the resultant magnetomotive-force vector AW describes a hexagon, shown in Fig. 2, instead of a true circle. If the distance along the line $ab$ between the point $a$ and the terminal point of the vector AW is designated by the symbol $x$ and the fractional resistance between the terminal 28 and the brush 20 (Fig. 1b) is designated by the symbol $R_y$, the relationship between these two variables will be given by the following equation:

$$R_y^2 - R_y \cdot \frac{2Rx - (R+R_E)}{2x-1} - \frac{RR_E x}{2x-1} = 0$$

assuming that $ab=ac=bc=1$, where R is the total resistance of the resistor 26 and $R_E$ is the resistance of each of the receiver coils 34, 35 and 36. This equation indicates the relationship between the fractional transmitter resistance $R_y$ and the value $x$. Consequently it also determines the relationship between the fractional transmitter resistance and a tangential function of the angle $A_E$ of the receiver point 37. The percentage transmitter resistance is proportional to the angle of the transmitter pointer 22. Disregarding the tangential function, the error is a minimum when the values of R and $R_E$ in the foregoing equation are so chosen as to make $(R_y/R — x)$ a minimum, where the ratio $R_y/R$ is percentage transmitter resistance and $x$ is a tangential function of the receiver angle. Consideration of the tangential function will slightly modify the determination and the graphical method best employed for representing the variation of error with relationships between R and $R_E$. For maximum precision the quantity to be reduced to a minimum is ($R_y/R$ minus an inverse tangential function of $x$). The inverse tangential function is the length of the arc subtended by the angle $A_E$ divided by the length of the arc $ab$.

I have found that the error introduced by the relationship between the receiver angle and the transmitter angle may be reduced to a negligible minimum by dimensioning the apparatus to have a predetermined resistance ratio between the resistor 26 of the receiver coils 34, 35 and 36 of the receiver. In the case of the delta-connected three-phase system I have found that the error substantially disappears, being reduced to a few seconds of arc, when the resistance ratio $R_E/R$ falls approximately within the range 4.5 to 5.5.

It is well konwn to those familiar with three-phase windings in alteranting-current circuits, that there is a mathematical equivalence between a Y-connected and a delta-connected winding and that for the same performance the required impedance of the coils of a Y-connected three-phase winding will be one-third the impedance of the coils of a delta-connected winding. In other wirds, each coil of a Y-conected winding has an equivalent delta impedance three times its actual impedance and conversely the equivalent Y impedance of the delta-connected winding is one-third its actual impedance. I have found that this principle of methematical equivalence applies also in multi-coil direct-current telemeter windings. Accordingly, if the receiver coils are connected in Y instead of in delta, the resistance ratio $R_E/R$ is to be made about one-third of the optimum value for the delta connection. Specifically, for Y-connected receiver colis the ratio between the resistance of each coil and the resistance of the resistor in the transmitter should fall between 1.5 and 2.17. Similarly, in the case of other polyphase connected receiver coils the resistance ratio is to be made that which has a three-phase delta equivalent value lying between 4.5 and 5.5.

Fig. 3 is an error curve showing the relationship between the angular error of the receiver pointer 37 and the ratio $R_E/R$ in terms of the delta equivalent. It will be observed that the branches of the curve on the positive and negative sides of the horizontal axis do not blend without discontinuity, but they enclose an area in which the error is a minimum for a certain resistance ratio $R_E/R$ as shown in the magnified portion of the error curve reproduced in Fig. 4. Just as it is necessary to reduce a Y-connected rotor to the mathematical delta equivalent in order to apply the ratio of 4.5 to 5.5, so also it is necessary also to consider the mathematical equivalent when several receivers are connected in parallel, as in this case each phase of the transmitter has several receiver resistances in parallel across it.

Similarly, for two-phase systems the optimum ratio will be two-thirds of the Y ratio or two-ninths of the equivalent delta ratio. In other words, the ratio between the transmitter resistance and the resistance of each receiver coil should lie between 1.0 and 1.45. However, owing to the fact that with only two phases the error becomes relatively greater at the end points, I prefer to limit the resistance ratio to a smaller range between 1.05 and 1.30. In the case of a compensated two-phase system such as shown in Fig. 5 having compensating resistors 41 and 42, each equal in value to the resistance of one of the receiver coils, the preferred ratio range is between .55 and .70. Owing to the compensation the ratios may be slightly greater than one-half the ratios in the case of the uncompensated two-phase system, the mathematical equivalent values being one-half.

My invention is not limited to any specific numbers of coils or phases, and may be used generally in receivers having a plurality of coils as "polyphase" systems by reducing the transmitter to receiver resistance ratio to the mathematical equivalent stated in terms of the delta ratio. In two-phase systems as shown in Figs. 5 and 6, the rotors consist of two coils 43 and 44. The contact segments 24 and 25 of the transmitter of Figs. 1a and 1b are replaced by 90-degree contact segments 24' and 25' with four brushes 45, 46, 47 and 48 instead of three. In Fig. 5 the compensating resistors 41 and 42 are connected between the mid-point 49 of the resistor 26 and the brushes 45 and 46. In case the compensating resistors 41 and 42 are not employed, four conductors 50, 51, 52 and 53 are run between the brushes 45, 46, 47 and 48 and the ends of the receiver coils 43 and 44.

In place of employing a large number of contact points 29, 30, the brushes of the transmitter may also be caused to travel directly over the turns of the toroidally wound resistors somewhat in the manner of the aforesaid Faus patent.

I have herein shown and partially described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A direct-current telemetering system comprising a transmitter and a receiver connected by a plurality of conductors, said transmitter comprising a source of current and a potentiometer having end terminals and an adjustable tap, the end terminals being connected to the source of current and to two of the conductors joining the transmitter and receiver, the adjustable tap being connected to a third conductor between the transmitter and receiver and being adapted to be adjusted in position on the potentiometer in accordance with measurements or indications to be transmitted and said receiver comprising a plurality of interconnected coils forming a magnetic field winding and a member which is magnetically polarized to cooperate with the field winding, said field winding and said polarized member being relatively movable and being adapted to take up a relative position representing the position of the tap on the potentiometer at the transmitter, said receiver coils having terminals connected to the conductors joining the transmitter and the receiver, the ratio between the resistance of the potentiometer and the equivalent delta resistance of one of the receiver field coils lying within the range in which the deviation between percentage resistance of the transmitter potentiometer and a tangential function of the angle taken up by the receiver is a minimum.

2. A direct-current telemetering system comprising a transmitter and a receiver connected by a plurality of conductors, said transmitter comprising a source of current and a potentiometer having end terminals and an adjustable tap, the end terminals being connected to the source of current and to two of the conductors joining the transmitter and receiver, the adjustable tap being connected to a third conductor between the transmitter and receiver and being adapted to be adjusted in position on the potentiometer in accordance with measurements or indications to be transmitted and said receiver comprising a plurality of interconnected coils forming a magnetic field winding and a member which is magnetically polarized to cooperate with the field winding, said field winding and said polarized member being relatively movable and being adapted to take up a relative position representing the position of the tap on the potentiometer at the transmitter, said receiver coils having terminals connected to the conductors joining the transmitter and the receiver, the ratio between the resistance of the potentiometer and the equivalent delta resistance of one of the receiver field coils lying substantially within the range between 4.5 and 5.5.

3. In a direct-current telemetering system, a transmitting comprising a pair of relatively rotatable elements, one of which comprises three brushes arranged 120 degrees apart on the circumference of a circle and adapted to be connected by conductors to a three-coil receiver, and the other of which rotatable elements comprises a pair of arcuate contact segments to which a source of direct current is adapted to be connected, and a potentiometer resistor electrically connected between said contact segments, said contact segments each being approximately 120 degrees in angular length and having adjacent ends about 60 degrees apart, said potentiometer resistor having taps arranged along the arc of a circle in the gap between said contact segments, said taps and contact segments lying along the circumference of the same circle as said brushes whereby the brushes are adapted to make electrical contact with said segments and taps successively as relative rotation of said elements takes place.

4. In a direct-current telemetering system, a transmitter comprising a pair of relatively rotatable elements, one of which comprises a plurality of brushes equiangularly spaced apart on the circumference of a circle and adapted to be connected by conductors to a multi-coil receiver, and the other of which relatively rotatable elements comprises a pair of arcuate contact segments to which a source of direct current is adapted to be connected, and a potentiometer resistor electrically connected between the said contact segments, said potentiometer resistor having taps arranged along the arc of a circle in a gap between said contact segments, said brushes being adapted to make contact with said segments and said taps as relative rotation takes place.

5. In a direct-current telemetering system, a transmitter comprising a pair of relatively rotatable elements, one of which comprises four brushes arranged 90 degrees apart on the circumference of a circle and adapted to be connected by conductors to the end terminals of the coils of a cross-coil receiver, and the other of which relatively rotatable elements comprises a pair of arcuate contact segments to which a source of direct current is adapted to be connected and a potentiometer resistor electrically connected between said contact segments, said contact segments being approximately 90 degrees in length and having their adjacent ends spaced about 90 degrees apart, said potentiometer resistor having taps arranged along the arc of a circle in the gap between said contact segments, said brushes being adapted to make electrical contact with said segments and said taps successively as relative rotation takes place.

6. In a direct-current telemetering system, a transmitter comprising a pair of relatively rotatable elements, one of which comprises four brushes arranged 90 degrees apart on the circumference of a circle, two adjacent brushes being adapted to be connected by conductors to the end terminals of the coils of a cross-coil receiver, and the other of which relatively rotatable elements comprises a pair of arcuate contact segments to which a source of direct current is adapted to be connected, a potentiometer resistor electrically connected between said contact segments, and a compensating resistor electrically connected between the remaining two of said brushes, said contact segments being symmetrically placed along the circumference of a circle, the midpoints of said resistors being electrically connected and being adapted to be connected by a conductor to a junction terminal of the coils of a cross-coil receiver, and said potentiometer resistor having a plurality of taps arranged along the arc of a circle in the gap between said contact segments, said brushes being adapted to make electrical contact with said segments and said taps successively as relative rotation takes place.

GERD HEMPEL.